Jan. 19, 1965  E. MASCHKE  3,166,245
ELECTRIC REVOLUTION COUNTER
Filed March 5, 1964
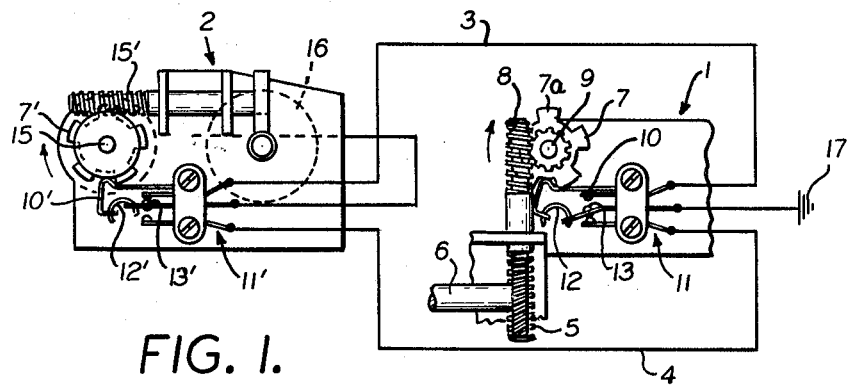
FIG. 1.
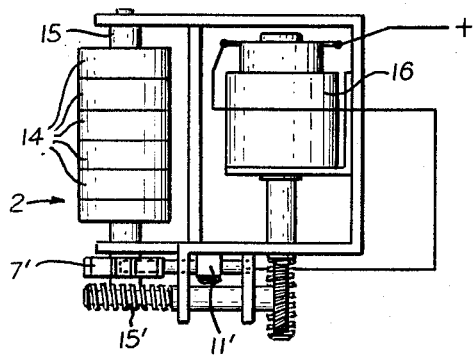
FIG. 2.
FIG. 3.
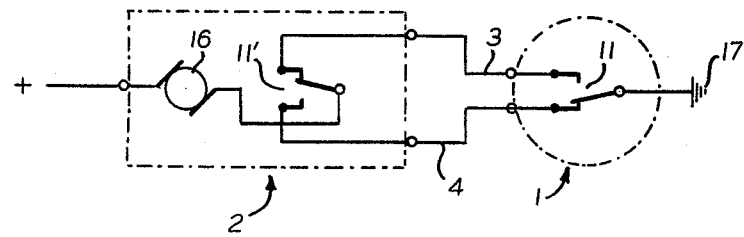
INVENTOR
EDGAR MASCHKE
BY
ATTORNEY.

ns patent office 3,166,245
Patented Jan. 19, 1965

3,166,245
ELECTRIC REVOLUTION COUNTER
Edgar Maschke, Frankfurt am Main, Germany, assignor to VDO Tachometer Werke Adolf Schindling G.m.b.H., Frankfurt am Main, Germany, a corporation of Germany
Filed Mar. 5, 1964, Ser. No. 349,719
Claims priority, application Germany, Apr. 2, 1963, V 23,884
3 Claims. (Cl. 235—95)

The present invention relates to electric revolution counters, particularly to counters of covered distances by automatic vehicles, which counters are driven stepwise by a motor, whereby the motor in turn is controlled in response to predetermined numbers of revolutions from an impulse sender.

In the known counters of this type, particularly for the counter mechanism of covered distances of electrical tachometers in automotive vehicles, stepping motors are used for the drive of the counters, which stepping motors are controlled by an impulse sender, which is connected with the shaft, the revolutions of which are to be counted. It is further known to control a relay from the shaft to be measured within a cycle operation of a predetermined number of revolutions of the shaft. The relay closes the circuit of a magnet in the counter mechanism, which magnet operates a pawl operated intermittent mechanism for the stepwise advancement of the counter. A pawl operated intermittent mechanism has the drawback that it is subjected to high wear due to its continuous operation and is unreliable in its function. Stepping motors are relatively complicated and expensive.

It is, therefore, one object of the present invention to provide an electric revolution counter, which amounts to a very simple and safe remote control of an electric counting mechanism, which makes possible the use of conventional direct-current motors for the drive of the counter and which excludes any miscounting, as in a mechanical coupling of the counter mechanism, with the shaft to be measured.

It is another object of the present invention to provide an electric revolution counter, wherein a switching contact is connected with the impulse-sender and the counter mechanism, the switching contact permitting switching over of the driving motor of the counter alternately to two different feeding lines, whereby the switching contact connected with the impulse-sender switches on alternately the circuit of the counter motor within the cycle of predetermined numbers of revolution over one of the two feeding lines and the switching contact, connected with the counter mechanism upon further rotation of the counter for one counting step interrupts the circuit of the counter motor automatically over the one feeding line in correspondence with the predetermined number of revolutions and switches over to the other feeding line for the preparation of the next counting step.

The counter designed in accordance with the present invention is particularly suitable for electric tachometers and permits the use of the same robust counters with the same reduction gear drives, which are used in tachometers driven mechanically by means of a flexible shaft.

With these and other objects in view, which will become apparent in the following detailed description, the present invention will be clearly understood in connection with the accompanying drawing, in which:

FIGURE 1 is a side elevation of the impulse-sender and of the counter mechanism, as well as of the connecting feeding lines;

FIG. 2 is a top plan view of the counter mechanism; and

FIG. 3 is a schematic circuit diagram of the electrical connections.

Referring now to the drawing, the device for the electrical remote counting of revolutions comprises substantially an impulse sender 1 and a counter mechanism 2, which are electrically connected with each other by means of two feeding lines 3 and 4. The impulse-sender 1 comprises a shaft 5 driven by means of a second shaft 6, the number of revolutions of which are to be counted and the shaft 5 drives in turn a cam gear 7 by means of a reduction gear consisting of a worm 8 mounted on or integral with the shaft 5 and a gear 9 keyed to the shaft of the cam gear 7. One or a plurality of cam teeth 7a are provided on the cam gear 7 such, that the width of the cam tooth 7a effective at the outer periphery and the width between two adjacent cam teeth 7a are equal. An angular spring 10 of a conventional spring switch 11 engages the periphery of the cam gear 7 in a pretensioned state. The reduced speed of the drive of the cam gear 7 is chosen such, that a predetermined number of revolutions, for instance, 10 or 100 revolutions of the shaft to be measured, or in a counter of covered distances, as in the example, a predetermined length of travel, for instance 100 m., corresponds with the angular rotation of the cam gear 7 for an effective width of the cam tooth 7a or of a space between two adjacent cam teeth 7a. If the angular spring 10 is lifted by a cam tooth 7a, a sweep spring 12 switches a contact 13 mounted on a spring-biased tongue. If the cam gear 7 of the shown embodiment is rotated further for $1/10$ of its periphery, the angular spring 10 falls into the next following recess between the adjacent cam teeth 7a, and the spring switch 11 switches back to the original position.

A conventional roller counting device is used as a counter mechanism, which is indicated in the drawing by a plurality of number rollers 14. A cam gear 7' is mounted on a shaft 15 of the counting mechanism similar to the cam gear 7 of the impulse sender 1, which cam gear 7' controls, in similar manner, a spring switch 11'. The counter shaft 15 is driven by means of a reduction worm gear drive 15' by a direct-current motor 16, for instance, a conventional toy motor. The motor 16 is electrically connected to the plus terminal of the current source (not shown) and is connected alternately with the impulse sender 1 by means of the feeding lines 3 and 4, the switching contact 13 of which is connected to ground 17. The counter mechanism 2 is equipped with a sweep spring 12' cooperating with an angular spring 10'.

The operation of the electric counter is performed in the following manner (FIGS. 1 and 3):

The switching contact 13' is shown in such position, in which it has opened the circuit through the connecting feeding line 4 and has switched over to the feeding line 3. While the motor now stands still, the cam gear 7 of the impulse sender 1 rotates further in the direction of the arrow. Upon reaching the predetermined number of revolutions or length of travel, the cam tooth 7a of the cam gear 7 now to be effective, switches over the contact 13 of the spring switch 11 to the feeding line 3 by raising the angular spring 10 and closes again the circuit. The motor 16 continues operation until the cam gear 7' sitting on the counter shaft 15 has been turned ahead in the direction of the arrow for one counting step and the angular spring 10' of the spring switch 11' falls back into the following cam recess, to switch the contact 13' to the connecting feeding line 4 and to interrupt the circuit through the feeding line 3. Upon reaching the next predetermined number of revolutions of the shaft 5, the impulse sender 1 switches again to the connecting feeding line and the cycle is repeated.

The reduction gear 15' of the motor drive of the counter is chosen such, that the running time of the motor is less than the running time of the predetermined number of revolutions of the shaft 6 to be measured at its highest rotation speed, so that the counter comes to a standstill by all means and the counter step is terminated, prior to the switching over of the impulse sender 1 to the other connecting feeding line. Inaccuracies in the running time of the motor, for instance, by voltage variations, are of no effect since the motor is switched off by means of the switch 11' from the prevailing connecting feeding line 3 or 4, if the counting step is terminated. Inaccuracies of the effective cam or intermediate space forms of the cam gear 7' can bring about at their best an inaccuracy in the size of small proportions of the smallest setting number of the counter, never, however, in the total sum, since the inaccuracies are compensated for again during a rotation of the cam gear 7'. Since the counting steps run off relatively fast, the counter offers the impression of a jumping counting mechanism.

While I have disclosed one embodiment of the present invention, its is to be understood that this embodiment is given by example only and not in a limiting sense, the scope of the present invention being determined by the objects and the claims.

I claim:
1. An electric revolution counter, particularly a counter of covered distances by automotive vehicles, comprising
    an impulse sender including a driven shaft,
    a counter mechanism, including a counter,
    two feeding lines for alternate connection of said impulse sender with said counter mechanism,
    said counter mechanism including an electric motor,
    said electric motor driving stepwise said counter and being controlled by said impulse sender in response to predetermined number of revolutions of said driven shaft,
    a first switching contact coordinated to said impulse sender,
    a second switching contact coordinated to said counter mechanism,
    said switching contacts switching alternately said electric motor from one to the other of said feeding lines,
    said first switching contact switching on said electric motor alternately to one of said feeding lines within a cycle of predetermined numbers of revolutions, and
    said second switching contact automatically disconnecting said electric motor from said one of said feeding lines upon further rotation of said counter for one counting step corresponding with the value of the predetermined number of revolutions and switching over to the other of said feeding lines for the preparation of the next counting step.

2. The electric revolution counter, as set forth in claim 1, wherein
    said switch contacts comprise
        a spring switch and
        a cam teeth gear controls said spring switch, and the peripheral width of the teeth of said cam teeth gear and the peripheral width of the recesses between each pair of adjacent teeth are of equal length.

3. The electric revolution counter, as set form in claim 1, wherein
    said motor is a low-powered direct current motor.

References Cited by the Examiner
UNITED STATES PATENTS

| | | | |
|---|---|---|---|
| 2,243,738 | 5/41 | Mather | 74—160 |
| 2,357,199 | 8/44 | Holst | 73—205 |
| 2,448,643 | 9/48 | Wilkins | 235—104 |
| 2,916,569 | 12/59 | Fackler | 235—103 X |
| 3,123,293 | 3/64 | Kernander | 235—103 |

LEO SMILOW, *Primary Examiner.*